Jan. 30, 1962     G. A. LYON     3,018,856
BRAKE DRUM COOLING DEVICE
Filed Nov. 29, 1957     3 Sheets-Sheet 1
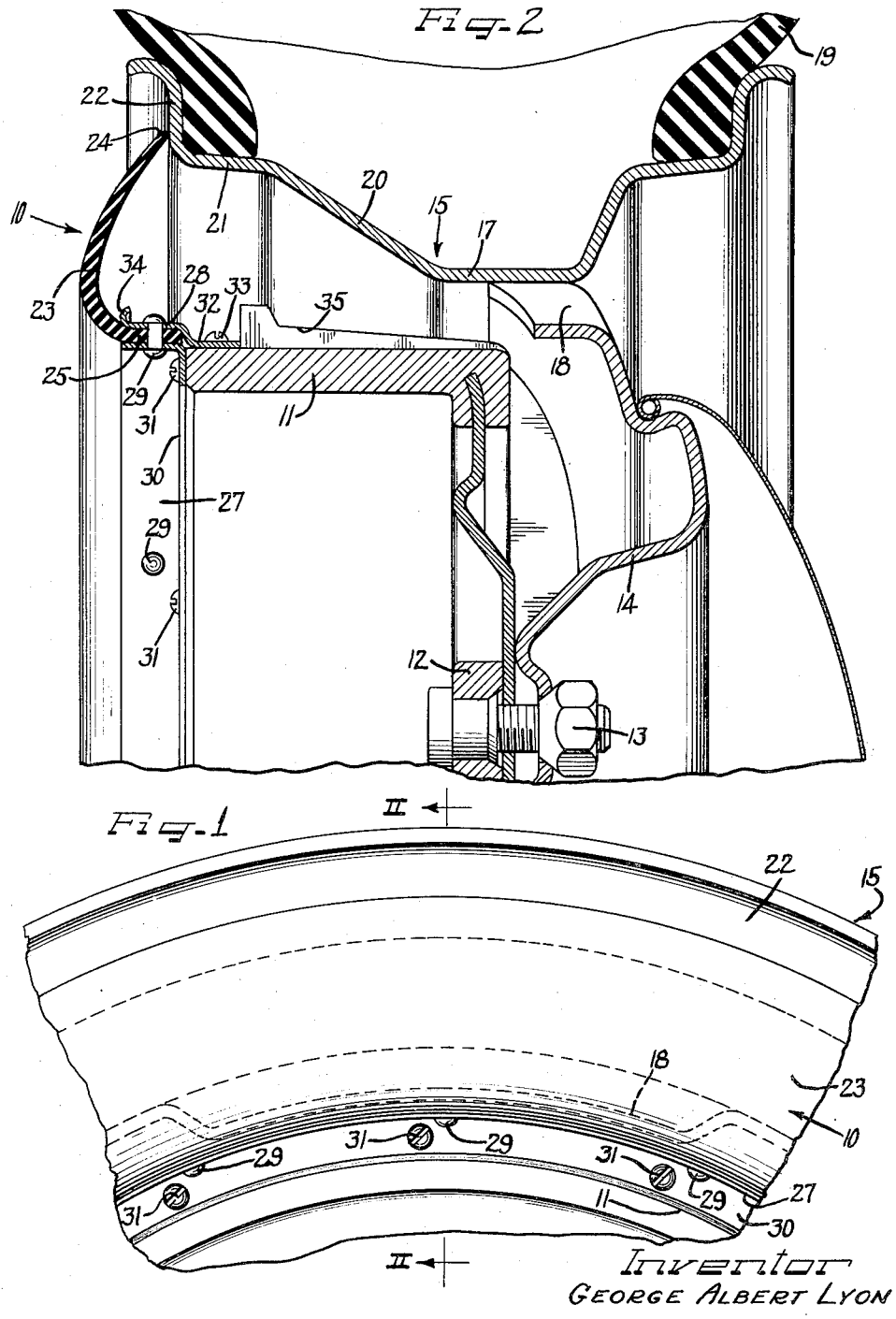
Inventor
GEORGE ALBERT LYON Jan. 30, 1962 — G. A. LYON — 3,018,856
BRAKE DRUM COOLING DEVICE
Filed Nov. 29, 1957 — 3 Sheets-Sheet 2

Inventor
GEORGE ALBERT LYON

Jan. 30, 1962 G. A. LYON 3,018,856
BRAKE DRUM COOLING DEVICE
Filed Nov. 29, 1957 3 Sheets-Sheet 3
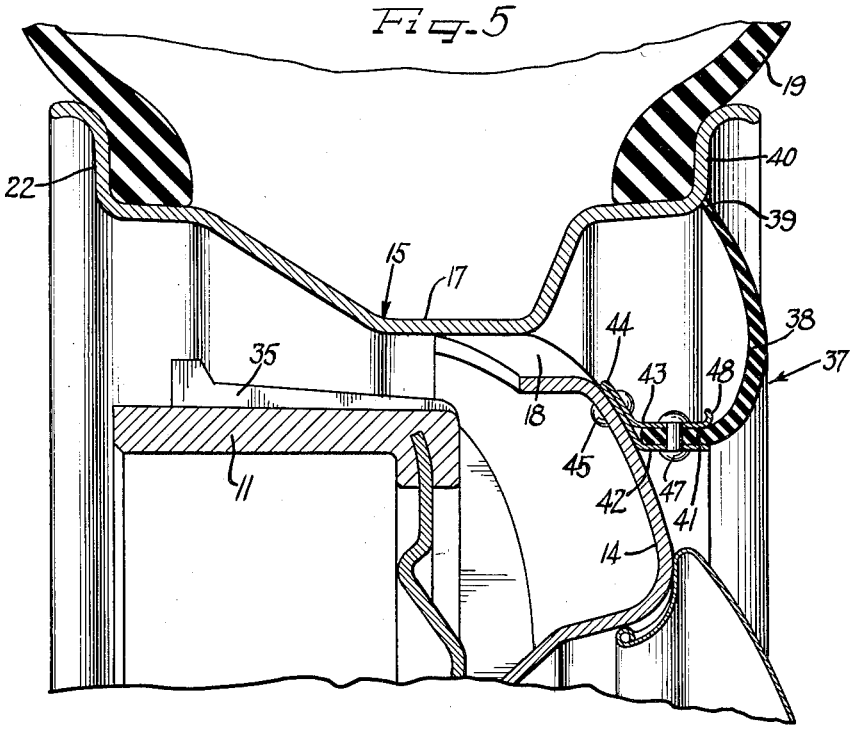
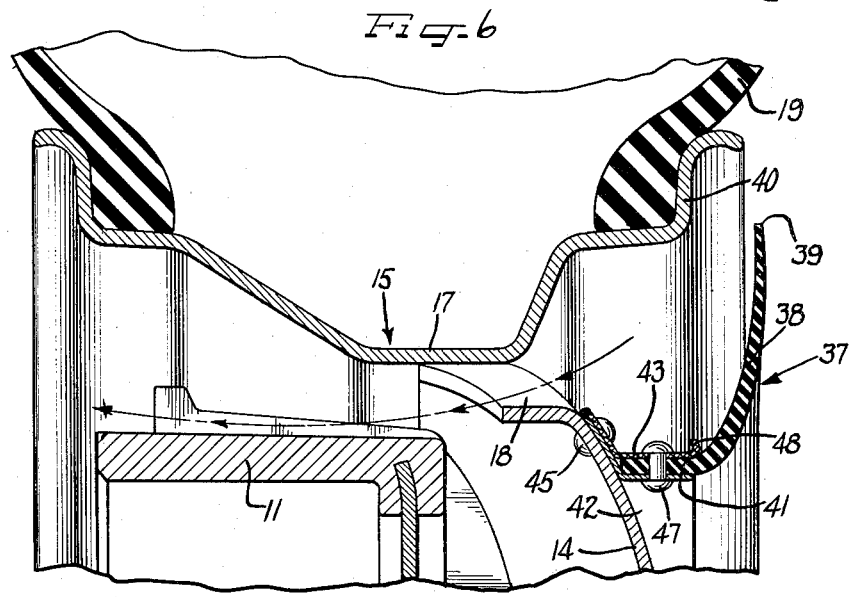
Inventor
GEORGE ALBERT LYON

United States Patent Office 3,018,856
Patented Jan. 30, 1962

3,018,856
BRAKE DRUM COOLING DEVICE
George Albert Lyon, Detroit, Mich., assignor to Lyon Incorporated, Detroit, Mich., a corporation of Delaware
Filed Nov. 29, 1957, Ser. No. 699,628
9 Claims. (Cl. 188—264)

The present invention relates to improvements in brake drum cooling devices and more particularly concerns devices that are operative in the running of a vehicle wheel to effect air circulation over and past the associated brake drum for cooling purposes.

Inasmuch as the brake drum with which a vehicle wheel such as an automobile wheel is associated in service is entirely encompassed by the tire rim, there is a tendency especially during high speed operation of the air about the brake drum to stagnate or at least lose heat transfer ability due to rarefication due to the vacuumizing or suction effect of the slipstream air moving past the wheel well beyond the brake drum on both axial sides of the wheel. Overheating of the brakes substantially reduces their efficiency and, of course, is a serious wear factor.

It is, accordingly, an important object of the present invention to provide improved means for creating air circulation past and in heat transfer relation to a brake drum in the running of the wheel.

Another object of the invention is to provide dynamic means for vehicle wheels to promote cooling circulation of air over and past the brake drums.

Still another object of the invention is to provide speed responsive air pump means for brake drum air circulation.

A still further object of the invention is to provide a novel flexible ring pump structure for mounting upon a brake drum or a vehicle wheel to effect positive air circulation through the wheel in response to accelerated running movements of the wheel.

Other objects, features and advantages of the present invention will be readily apparent from the following detailed description of certain preferred embodiments thereof taken in conjunction with the accompanying drawings in which:

FIGURE 1 is a fragmentary rear elevational view of a wheel structure embodying features of the invention;

FIGURE 2 is a fragmentary radial sectional detail view through the wheel structure taken substantially on the line II—II of FIGURE 1;

FIGURE 5 is a fragmentary radial sectional detail view through a wheel showing a modification; and FIGURE 6 is a sectional view similar to FIGURE 5 but showing the ring pump member in the open phase of a pumping stroke.

Figure 3:
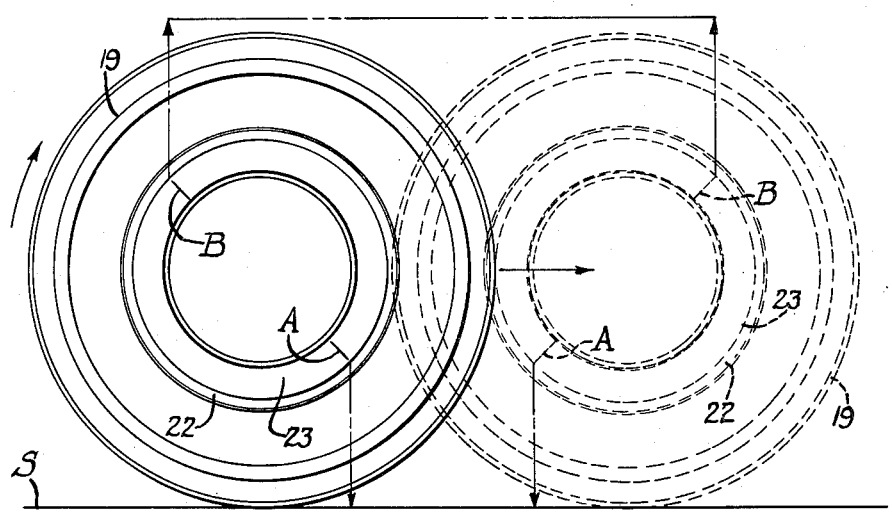
FIGURE 3 is a schematic illustration showing comparative rates of travel of various parts of the wheel during running over a surface.

According to one form of the invention, a ring pump structure 10 (FIGS. 1–4) is constructed and arranged for adaptation to a more or less conventional or preferred vehicle wheel assembly including a generally cup-shaped, axially inwardly opening brake drum 11 mounted on a hub flange 12 of a vehicle axle structure (not shown). Carried by the flange 12 are the usual attachment bolts or screws 13 by which a disk spider wheel body 14 is adapted to be attached concentrically with the vehicle axle. Supported by the wheel body is a drop center, multi-flange tire rim 15 including a base flange 17 with which the supporting margin of the wheel body 14 provides a circumferential plurality of wheel openings 18 at juncture of these parts through which air is adapted to circulate and more particularly for cooling the brake drum 11 in service. A pneumatic tire 19 is adapted to be supported by the tire rim 15.

From the base flange 17 of the tire rim extends toward the axially inner side of the wheel a side flange 20 of substantial width and directed diagonally generally axially inwardly and radially outwardly through an intermediate flange 21 which projects axially inwardly and merges with an inner terminal flange 22 provided with a generally radially outwardly extending portion that merges with a generally axially inwardly extending lip in the usual manner. In this instance, the rim flanges axially inwardly from the base flange 17 encompass the brake drum 11 in spaced relation and provide with the brake drum an air gap which converges from maximum width at its axially inner end toward minimum width at its axially outer end where the brake drum 11 and the base flange 17 of the tire rim are concentrically disposed in relatively narrow spaced relation adjacent to the margin of the wheel body 14 providing the wheel openings 18.

Positive circulation of air into and through the gap between the brake drum and the tire rim is effected in the running of the wheel, and therefore when the brake drum is most liable to overheat, by dynamic action of the ring pump 10 resulting from running movements of the wheel itself. To this end, the ring pump structure 10 includes a resiliently flexible, non-metallic pump ring member 23 preferably made from a rubber or rubber-like material of which butyl is an example. In its principal body portion, the ring member 23 is preferably of bowed or arched cross-section and tapered from a substantially thicker radially inner body section to a thinner radially outer tip 24 which is of a diameter to engage against the radially extending portion of the terminal flange 22 with the body of the ring 23 arched axially inwardly and across the mouth of the gap between the tire rim and the brake drum 11.

At its radially inner extremity portion or margin, the ring member 23 has a generally axially outwardly extending and in this instance cylindrical flange 25 by which the ring member is adapted to be secured to the brake drum 11. Securing means in this instance comprise a pair of securing rings 27 and 28 attached as by means of rivets 29 to respectively the radially inner and radially outer faces of the ring flange 25. On the axially outer margin of the securing flange ring 27 is a radially inwardly extending annular flange 30 which is arranged to be secured as by means of screws 31 to the axially inner edge of the brake drum 11. A concentric cylindrical axially outwardly projecting flange 32 on the securing flange ring 28 is adapted to be attached as by means of screws 33 to the radially outer side of the axially inner margin of the brake drum 11. On its axially inner end the securing flange ring member 28 has a generally radially outwardly and axially outwardly turned annular reinforcing and back-up lip flange 34 which is turned away from the adjacent generally concave axially outer face of the pump ring 23 but will serve as a buffer and strain relieving back-up for the opposed portion of the pump ring on movement of such ring portion against the turned flange 34.

Dynamic pumping action of the ring pump member 23 takes advantage of the phenomenon in running of vehicle wheels of the powerful centrifugal thrust imposed upon the upper and forward sector of the wheel. This is schematically illustrated in FIGURE 3. Assuming the wheel to be rotating clockwise and moving toward the right in the forward motion of the vehicle, it will be observed that a lower sector of the wheel identified by the short radial line A imposed schematically on the pump ring 23 travels only about ⅓ the distance forwardly that a diametrically opposite sector identified by the short radial line B travels from the rear toward the front during the same amount of rotary as well as forward movement of the wheel. The contrast in distance travelled is graphically shown by the distance between the depending parallel arrows from the two positions of the sector line A in contrast to the distance between the upwardly extending parallel arrows from the two positions of the sector line B.

Figure 4:
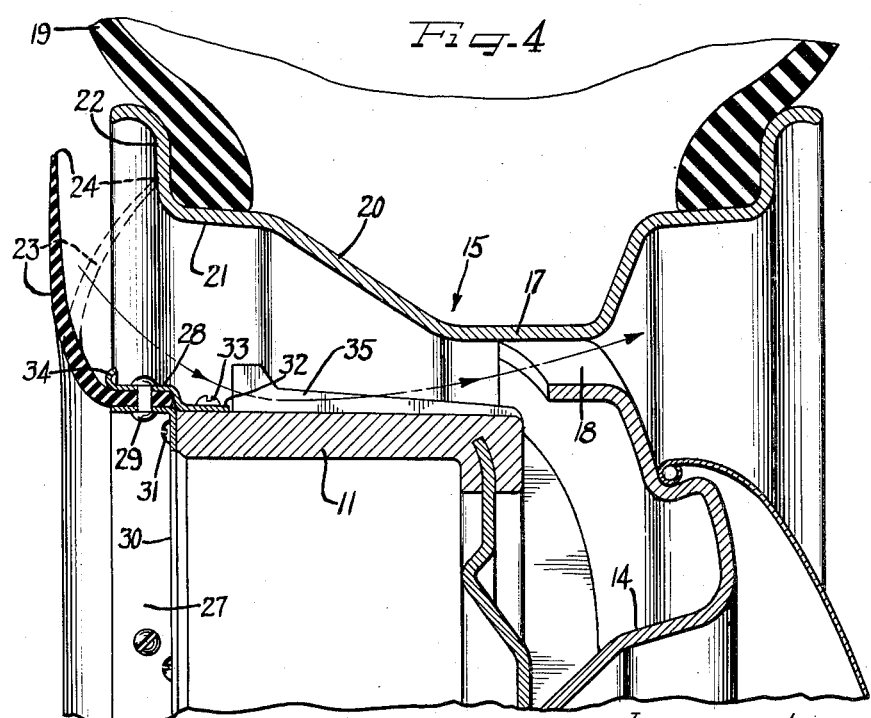
FIGURE 4 is a sectional detail view similar to FIGURE 2 but showing the ring pump member in the open phase of a pumping stroke.

Normally, the pump ring 23 tends to assume the position shown in FIGURE 2 wherein the free tip or edge 24 of the ring engages or at least is disposed close to the terminal flange 22 and with the body of the ring arched axially inwardly as shown. That portion of the pump ring which at any time coincides about with the sector line B of FIGURE 3, and more particularly with the forwardmost thrust position of the sector line as at the right side of FIGURE 3, reacts dynamically to the forwardly thrusting acceleration and centrifugal force to swing open as shown in FIGURE 4 from the normal dash outline position to the full line position with more or less snapping action flap-like. Then, as the wheel continues to rotate and such sector of the pump ring moves down toward the slower moving lower sector of the wheel, considered in a forward motion sense, the open sector of the pump ring closes toward the normal position. As this occurs at high speed there is a pumping action of the pump ring in the direction of closing movement of the centrifugally opened sector of the ring from the full line position to the dash line position of FIGURE 4 which effects movement of air by scooping it from the slipstream into the pump mouth afforded by the opened sector and then diverting and moving the air axially outwardly into and through the tire rim-brake drum gap generally in the direction of the arrows in FIGURE 4, in cooling relation over and past the brake drum 11 and through the wheel openings 18.

The pumping action of the ring member 23 is quite positive since due to the normal tendency of the relatively stiffly flexible ring body to maintain its closed position as shown in full line in FIGURE 2 and in dash line in FIGURE 4, there is substantial resistance to the centrifugal thrust opening of the affected valve ring sector so that such sector is snapped toward closed position immediately on being relieved of the wheel top centrifugal throw and thus pushes the air axially outwardly. The pumping action is quite uniform around the entire circumference of the pump ring progressively as a dynamic undulation which affords smooth, continuous positive movement of air through the tire rim-brake drum gap. Moreover, the velocity of the air pumped by the pump ring 23 is generally proportionate to the speed of travel and thus velocity of the associated vehicle. Hence, when there is greatest tendency toward heating of the brake drum 11, the greatest velocity of cooling air is pumped by the pump ring 23. In a sense, this may be termed automatic speed compensated air cooling of the brake drum.

By having the brake drum 11 equipped with peripheral axially extending heat dissipating ribs 35 disposed in the air stream passage afforded by the gap between the tire rim and the brake drum and the wheel openings 18, cooling efficiency is promoted.

In the modification of FIGURES 5 and 6, details of the wheel inclusive of the brake drum 11, the wheel body 14 and the tire rim 15 are substantially the same as in FIGURE 2 and therefore identical reference numerals identify identical parts. In this form of the invention, however, a resiliently flexible, non-metallic pump ring 37 is provided to operate on the axially outer side of the wheel and to serve at the same time as an ornamental trim for the outer side of the wheel. To this end, the ring pump 37 includes a non-metallic ring member 38 of a diameter to overlie the wheel openings 18 of the wheel and with the body of the ring member arched generally axially outwardly and of substantially thickened section as compared to a thinner tapered free edge 39 which is normally engageable with or at least closely approaches an outer side terminal flange 40 of the tire rim.

At its radially inner margin, the pump ring 38 is provided with a generally axially inwardly, cylindrical marginal flange 41 engaged between radially inner and radially outer retaining flanges 42 and 43 of a folded annular securing member 44 having the body thereof in the form of a flange that is secured as by means of rivets 45 to the wheel body 14 radially inwardly adjacent to the wheel openings 18. Rivets 47 may secure the ring flange 41 between the flanges 42 and 43 of the securing member. At the axially outer margin of the securing member flange 43 a turned buffer flange lip 48 is provided.

In operation, the pump ring structure 37 functions substantially the same as the pump ring structure 10 as is evident on comparison of FIGURES 5 and 6. Normally the ring member 38 assumes the closed position shown in FIGURE 5. In the centrifugal throw of the upper forward sector of the wheel as it runs in a forward direction, the coinciding sector of the ring member 38 is centrifugally swung open and then as it swings back axially inwardly toward the closing position, pumping action on the air at the inner side of the pump ring member causes the air to be pumped axially inwardly through the wheel openings 18 and in cooling flow over and past the brake drum 11 substantially as indicated by the directional arrows in FIGURE 6. This action is smoothly progressive about the entire circumference of the valve ring member 38 in the forward travel of the vehicle.

It will be understood that modifications and variations may be effected without departing from the scope of the novel concepts of the present invention.

I claim as my invention:

1. In a wheel structure including a tire rim and a brake drum with air circulation passage through the wheel past the brake drum, a pumping ring structure comprising an arched non-metallic flexible ring member having a generally axially inwardly extending thickened attachment flange on its radially inner margin, rigid generally axially extending opposed attachment flange members engaging said axial flange of the ring member therebetween, means securing said flange members to said attachment flange, said flange members having attachment flange structure projecting beyond said attachment flange of the flexible ring member, and means securing said attachment flange structure of the flange members rigidly to the wheel radially inwardly from said passage and with the flexible ring member extending generally radially into overlying relation to the adjacent end of the passage and arched generally axially away from the wheel but with a free end normally biased to lie closely adjacent to the wheel radially outwardly from said passage, said flexible ring member normally resisting straightening out and thus movement of said free edge away from the wheel, but being responsive to strong centrifugal thrust in the upper forward sector of the wheel while running at high speed to swing open progressively as circumferential portions of the ring member enter said sector but said portions moving back to the normal position upon leaving said sector in the continuing movement of the wheel forward and rotatably to thereby move air axially through said passage.

2. In a forwardly running vehicle wheel structure including a tire rim and a brake drum concentrically encompassed by the tire rim in air circulation gap passage relation, the wheel being subject during forward running thereof to the usual powerful centrifugal thrust in the upper and forward sector thereof as compared to the remaining sectors of the wheel, a circular pump structure mounted on the wheel radially inwardly adjacent to said gap and extending across the gap to the tire rim throughout the entire perimeter of the gap, said pump structure being normally biased toward close disposition relative to the tire rim and being centrifugally movable away from the tire rim progressively around its perimeter in said upper and forward sector of the wheel responsive to said centrifugal thrust while remaining in said close disposition to the tire rim throughout substantially the remainder of its perimeter, whereby to open a pump mouth in said sector and then move back toward the tire rim progressively in moving beyond said sector rotatively with the wheel and thereby push air that has entered through the mouth opening axially in cooling relation through said gap passage.

3. A vehicle wheel structure as defined in claim 2, wherein the pump structure is mounted on and is co-rotatable with the brake drum at the axially inner side of the wheel.

4. A vehicle wheel structure as defined in claim 2, wherein said pump structure is mounted on the axially outer side of the wheel.

5. In a vehicle wheel structure including a wheel body and a tire rim carried corotatively thereby with a brake drum at the inner side of the wheel body and encompassed by the tire rim in circular air circulation gap relation, the wheel body having adjacent juncture with the tire rim air circulation openings communicating with the air gap and providing therewith an air passage for cooling movement axially through the wheel past the brake drum, a resiliently flexible ring pump member having a radially inner attachment flange portion and a radially outer free axially resiliently flexible margin, and means securing said radially inner flange portion of the ring member to the wheel radially inwardly relative to said gap, said free margin of the ring member being normally biased to be closely disposed relative to the tire rim with the ring member extending across said passage and with the body of the ring member disposed axially away from the wheel member relative to the normal disposition of said free margin so that when said free margin is substantially straightened out radially relative to the ring body from the biased disposition of the free margin a radially outwardly opening mouth leading into said passage is opened, said ring member being responsive to centrifugal throw in the upper forward sector of the wheel in running forwardly at high speed with an associated vehicle for progressive continuous dynamic undulating pumping action by centrifugal radial straightening of those portions of the ring which progressively move into said sector whereby air is scooped through the mouth thus opened and the ring member then pumpingly pushes the air into and through said passage as the ring member returns to said biased disposition of said free margin on moving rotatively with the wheel beyond said sector.

6. A wheel structure as defined in claim 5 wherein said attaching means is secured to the brake drum to attach the ring member at the axially inner side of the wheel.

7. A wheel structure as defined in claim 5 wherein said attaching means is secured to the wheel body at the axially outer side of the wheel and the ring member extends between the wheel body and the tire rim across said passage.

8. In a ring pump structure for use with a vehicle wheel wherein the operation of the pump structure is dependent on the centrifugal thrust phenomena of a vehicle wheel, the pump structure including a resiliently flexible non-metallic ring body of substantial radial extent arched across its radial dimension to bulge in one axial direction and having a hollow side facing in the opposite axial direction, one margin of the body extending in said opposite axial direction, and substantially rigid attaching flange structure clamped onto said ring margin and having a portion thereof projecting beyond the free edge of said ring margin for attachment to a support, said flange structure being entirely free from the ring body beyond said one margin and the ring body being freely axially resiliently flexible relative to said one margin and said rigid attaching flange structure.

9. A ring pump structure as defined in claim 8 wherein said rigid attaching flange structure includes a portion located on the hollow side face of said one margin and is provided adjacent to said ring body with a turned buffer margin opposing the hollow side of the ring body as a strain relieving back-up for the opposed portion of the ring body on movement of such opposed portion against the turned buffer margin.

References Cited in the file of this patent

UNITED STATES PATENTS

| | | |
|---|---|---|
| 1,743,074 | Roth | Jan. 7, 1930 |
| 2,258,527 | Warman | Oct. 7, 1941 |
| 2,263,079 | Flynn | Nov. 18, 1941 |
| 2,265,938 | Eksergian | Dec. 9, 1941 |
| 2,418,707 | Groot | Apr. 8, 1947 |
| 2,457,344 | Butler | Dec. 28, 1948 |
| 2,478,649 | Wightman | Aug. 9, 1949 |
| 2,580,001 | Butler | Dec. 25, 1951 |
| 2,632,598 | Wales | Mar. 24, 1953 |
| 2,659,458 | Mercier | Nov. 17, 1953 |
| 2,681,761 | Schlumbohm | June 22, 1954 |
| 2,822,997 | Du Bois | Feb. 11, 1958 |
| 2,915,100 | Mantzel et al. | Dec. 1, 1959 |
| 2,936,715 | Southam et al. | May 17, 1960 |

FOREIGN PATENTS

| | | |
|---|---|---|
| 751,591 | Great Britain | June 27, 1956 |